United States Patent
Yang et al.

(10) Patent No.: US 10,357,040 B2
(45) Date of Patent: Jul. 23, 2019

(54) FOOD WITH REDUCED BREAKAGE AND A METHOD OF MAKING THE SAME

(71) Applicant: Intercontinental Great Brands LLC, East Hanover, NJ (US)

(72) Inventors: Wanwan Yang, Suzhou (CN); Yiwei Zhang, Suzhou (CN); Kevin Qian, Suzhou (CN); Vina Yao, Suzhou (CN); Manhu Gu, Suzhou (CN)

(73) Assignee: Intercontinental Great Brands LLC, East Hanover, NJ (US)

( * ) Notice: Subject to any disclaimer, the term of this patent is extended or adjusted under 35 U.S.C. 154(b) by 0 days.

(21) Appl. No.: 15/572,475

(22) PCT Filed: May 25, 2016

(86) PCT No.: PCT/US2016/034014
§ 371 (c)(1),
(2) Date: Nov. 7, 2017

(87) PCT Pub. No.: WO2016/196101
PCT Pub. Date: Dec. 8, 2016

(65) Prior Publication Data
US 2018/0168171 A1    Jun. 21, 2018

(30) Foreign Application Priority Data
Jun. 1, 2015   (CN) .......................... 2015 1 0293014

(51) Int. Cl.
*A21D 13/11*    (2017.01)
*A21D 2/18*    (2006.01)
(Continued)

(52) U.S. Cl.
CPC .............. *A21D 2/181* (2013.01); *A21D 13/11* (2017.01); *A21D 13/45* (2017.01); *A23L 5/15* (2016.08); *A23P 30/10* (2016.08)

(58) Field of Classification Search
CPC .......... A21D 2/181; A21D 13/45; A21D 13/11
See application file for complete search history.

(56) References Cited

U.S. PATENT DOCUMENTS

| 7,754,268 B2 | 7/2010 | Haas |
| 2002/0150663 A1* | 10/2002 | Haas ...................... A21D 2/181 426/548 |
| 2008/0248169 A1 | 10/2008 | Amend |

FOREIGN PATENT DOCUMENTS

| DE | 3817919 | 12/1988 |
| DE | 19648506 | 10/1997 |

(Continued)

OTHER PUBLICATIONS

Martha Stewart, Candy-Stripe Cookie Sticks, https://web.archive.org/web/20141204163617/https://www.marthastewart.com/318365/candy-stripe-cookie-sticks.*

(Continued)

*Primary Examiner* — Emily M Le
*Assistant Examiner* — Changqing Li
(74) *Attorney, Agent, or Firm* — Fitch, Even, Tabin & Flannery LLP

(57) ABSTRACT

The present invention relates to a food comprising a baked foodstuff based on flour and/or starch. The baked foodstuff comprises at least one first region and at least one second region in contact with the first region. The second region comprises a shaping auxiliary component in an amount of 0.5-15 wt % by the total weight of the flour and/or starch of the baked foodstuff. The shaping auxiliary component has a glass-transition temperature of less than 0° C. The second region is present in an amount of at least 1 wt % by the total weight of the food. The addition of the shaping auxiliary component is able to efficiently decrease the breakage of the (Continued)

multi-region food, especially multi-region food based on a baked foodstuff with a crispy texture.

15 Claims, 4 Drawing Sheets

(51) Int. Cl.
*A23P 30/10* (2016.01)
*A21D 13/45* (2017.01)
*A23L 5/10* (2016.01)

(56) References Cited

FOREIGN PATENT DOCUMENTS

| | | | |
|---|---|---|---|
| DE | 19648506 C1 * | 10/1997 | ............. A21C 15/02 |
| GB | 2001517 | 2/1979 | |
| JP | H10155410 | 6/1998 | |
| WO | 0005966 | 2/2000 | |
| WO | 2013143840 | 10/2013 | |

OTHER PUBLICATIONS

International Search Report, dated Aug. 8, 2016 for International Application No. PCT/US2016/034014 (4 pgs.).
Mintel, "Cocopandan Flavoured Mini Cream Wafer Sticks", Aug. 2013 (1 pg.).
Mintel, "Fortified Cookies", Nov. 2004, (1 pg.).
International Preliminary Report on Patentability, dated Dec. 14, 2017, for International Application No. PCT/US2016/034014 (9 pgs).

* cited by examiner

FOOD WITH REDUCED BREAKAGE AND A METHOD OF MAKING THE SAME

CROSS REFERENCE TO RELATED APPLICATIONS

This application is a U.S. national phase application of International Application No. PCT/US2016/034014, filed May 25, 2016, which claims benefit from Chinese Application 201510293014.1, filed Jun. 1, 2015, which are each hereby incorporated herein by reference in their entirety.

FIELD

The present invention relates to a food, specifically, a food based on a baked foodstuff, which is not readily broken and cracked, and a method of making the same.

BACKGROUND

Due to its flavorful and crispy taste and its various appearances, multi-region food based on baked foodstuffs, such as wafer pieces, hollow wafers, wafer cones, wafer cups, wafer biscuits and wafer rolls, etc., especially multi-region food which may provide the consumer with a visually distinguishing sensation with respect to each of the regions, is very popular with consumers.

Normally, the methods used in the field for preparing food with a crispy texture based on baked foodstuffs are to bake a flowable baking mixture for a short time so that the baking mixture is substantially in a state of ustulation. In this state, the relatively low content of residual water in the food results in the crispy texture of the baked product at room temperature. However, such a crispy texture brings both a pleasant experience to consumers and a great challenge for maintaining the integrity of the food during the processing or shelf life. This problem has been particularly acute in multi-region food that provides a visually distinguishing sensation. During the preparation of baked foodstuff based on multi-region food, each of the regions is usually prepared with different baking mixtures having different colors and/or flavors respectively. These different baking mixtures having different colors and/or flavors form the sheets serving as the multiple regions on the multi-region food which are visually distinguishing. These sheets are configured adjacently to form the desired appearance of the food. However, due to the crispy property of the food based on the baked product (for example, a wafer biscuit) itself, the joint part between the adjacent regions of the food may be cracked and broken prior to consumption (such as during processing, packaging, transporting and shelf life). This cracking and breakage may increase the possibility of a sub-quality product, decrease the production efficiency, and compromise the sensation of consumers of the multi-region food as providing visual distinctiveness. Additionally, the crumbs resulting from the product breakage will further damage the consumption experience of consumers. Therefore, it is desirable to provide a food which is improved, not readily broken, and able to provide the desired crispy texture at room temperature.

For food with a crispy texture (for example, those based on a baked foodstuff), glass transition temperature (Tg) is one of the critical assessment parameters for its texture. Glass transition refers to the transition of amorphous polymer (including the amorphous part of crystalline polymers) from a glassy state to a rubbery state, or from a rubbery state to a glassy state. During the transition, the micro-Brownian movement of the chain segment of the polymer becomes frozen during cooling or unfrozen during heating. The temperature characteristic for such a procedure is named glass transition temperature, or Tg, for short. It is already known in the field that decreased Tg is able to improve the flexibility of food having a crispy texture during normal processing and storing, thereby significantly improving the property of the frangibility of the food. Various ingredients in the food, such as protein, carbohydrate, fat, water, etc, may influence Tg.

It is commonly known in the field that, the Tg of water is extremely low, which is only −135° C. Therefore, the content of water significantly influences the Tg of food. In consideration of the characteristics of water molecules, water can be regarded as a powerful plasticizer. Therefore, the Tg of the baked product may be decreased by increasing water content therein. However, due to the moderate water adsorption at room temperature, deformation of the baked foodstuff based food (such as a wafer biscuit) without damage at room temperature may just occur at the moisture content of 10 to 20 wt %. After deformation, the food may regain the crispy and fragile texture by means of drying only, which also allows the food to keep the new shape derived from the deformation. But the drying to remove water is a relatively difficult procedure, and the relatively high water content within the food may cause damage to the porous structure of the wafer biscuit, which compromises the mouthfeel and appearance of the product.

As one of the main ingredients of food based on a baked foodstuff, edible saccharides, especially soluble small molecule saccharides, such as fructose, glucose, sucrose, etc, also have significant influence on the Tg of baked food. The increase of sugar content contributes to baked food which is thermally deformable and has a crispy texture after cooling. In the field, people realize that the high sugar content included in a baking mixture recipe helps to obtain thermally deformable baked food through relatively simple operations, which thus are often used for producing a wafer biscuit and wafer-like baked foodstuff having a thin wall, as well as a baked product not readily broken. This is because these baked goods usually need to be reshaped after the baking step (for example, by wrapping, winding, pressing, stamping, embossing, bending, folding or deep-drawing, etc.), and the setting after the shaping is simpler than removing water. However, besides the desired processability of the food with crispy texture based on a baked foodstuff, the increase of sugar content may also bring large amounts of sugar to the food, which is not desirable for the health of consumers. Besides, it has been found that adding sugar, even large amounts of sugar, into the baking mixture is not sufficient to solve the problem of cracking in the joint part of the multi-region food and the problem of product breakage after wrapping.

Although disclosed in U.S. Pat. No. 7,754,268, that the addition of erythritol, sorbitol and the combination thereof into the whole baking mixture to partially or completely replace the sugar to serve as an efficient plasticizer, there is no doubt that using a large amount of sugar alcohol within the whole product would increase the cost of products.

Therefore, a demand has long existed in the field for a multi-region food with a decreased likelihood of cracking, which is not readily broken before consuming, and without compromising cost.

SUMMARY

According to one aspect, there is provided a food comprising a flour and/or starch based baked foodstuff. The baked foodstuff comprises: at least one first region and at least one second region in contact with the first region; the second region comprising a shaping auxiliary component in an amount of 0.5-15 wt % by the total weight of the flour and/or starch of the baked foodstuff. The shaping auxiliary component has a glass-transition temperature of less than 0° C., wherein the second region is present in an amount of at least 1 wt % by the total weight of the food. Preferably, the second region comprises a shaping auxiliary component in an amount of 0.5-10 wt %, more preferably 0.7-5 wt %, by the total weight of the flour and/or starch of the baked foodstuff.

In some embodiments, the shaping auxiliary component is polyol, and preferably, the shaping auxiliary component is polyol with 4-6 carbon atoms. Preferably, the polyol used herein is selected from the group consisting of erythritol, xylitol, sorbitol, mannitol and combinations thereof; and more preferably, the polyol is selected from the group consisting of erythritol, sorbitol and the combination thereof. It has been found that when making a multi-region food based on a baked foodstuff (for example, a wafer biscuit), the addition of the shaping auxiliary component having a glass-transition temperature of less than 0° C. (for example, polyols) into the baking composition of any one of the multiple adjacent regions of the multi-region food may largely decrease the cracking at the join part between two adjacent regions. Further, it has also been found that the polyol with 4-6 carbon atoms, particularly erythritol, xylitol, sorbitol, mannitol, etc. or combinations thereof, is a very efficient shaping auxiliary component for the thermally-deformable baking composition with crispy texture at room temperature.

For food with a crispy texture, Tg may be significantly reduced by adding polyols with 4-6 carbon atoms and Tg of less than 0° C. (for example, erythritol, xylitol, sorbitol, mannitol and combinations thereof, etc.), as compared with food without the foregoing polyols, leading the food to have enough toughness during processing, transporting and shelf life, which not only helps the further shaping and processing of the food, but also helps the food to maintain the unbroken appearance for a considerably long time. For example, for multi-region food having a crispy texture and two regions adjacently disposed, the addition of the foregoing polyol with 4-6 carbon atoms into the at least one region of the adjacent regions would significantly fix the cracking problem between the adjacent regions. Further, if the foregoing polyol is added to the edge of the food sheet to be wrapped, such edge portion would be able to provide a sufficient "binding" and "wrapping" effect to the cylinder-shaped food formed during the wrapping process. As such, breakage in the edge portion would be efficiently reduced, leading to a more integrated appearance of a food having a cylinder shape. Moreover, the efficient reduction of breakage of the edge portion is desirable for providing multi-region food which may provide consumers with a visually distinguishing sensation. By employing such a way of adding polyol into a part of the food, the dosage of polyol may be reduced to a maximum degree, while ensuring the desired processing effect, and there is no need to increase the amount of sugar (the amount of sugar may even be significantly reduced), which leads to an efficiently decreased cost. In the food, the regions with the added shaping auxiliary component should be present in an amount of at least 1 wt % by the total weight of the food. When the amount of the shaping auxiliary component is less than 1 wt %, an object of the present disclosure may not be achieved.

In some embodiments, the first region may be free of the shaping auxiliary component. In some embodiments, the first region may comprise the shaping auxiliary component, such as polyol, in a plastically effective amount.

In some embodiments, in the multi-region food, at least one first region and at least one second region are configured alternately.

In some embodiments, the baked foodstuff is configured as a sheet strip. Preferably, the sheet strip is elongated. The baked foodstuff is thermally-deformable and may provide a crispy texture and fixed shape for the food after cooling. In some embodiments, the baked foodstuff can further be configured into any configuration based on the sheet strip (for example, a configuration derived from an optional reshaping processing).

As shown in FIG. 1, the sheet strip (100) comprises at least one first sheet (101) and at least one second sheet (102). The first sheet has a first width (a), and the second sheet has a second width (b). The first sheet comprises a first region, and the second sheet comprises a second region. The sheet strip has a length direction (10) and a width direction (11), wherein the at least one second sheet (102) is adjacent to the at least one first sheet (101) in the width direction (11), and the first sheet (101) and the second sheet (102) extend in parallel in the length direction (10). In some embodiments, the ratio of the first width (a) to the second width (b) is 79:1 to 1:79, and preferably, the ratio of the first width (a) to the second width (b) is 79:1 to 70:10. In some embodiments, the ratio of the first width (a) to the second width (b) is 75-85:1-6.

In some embodiments, the baked foodstuff is a wafer biscuit. In some embodiments, the strip is based on a wafer biscuit.

In some embodiments, the second region is prepared with a second baking mixture. In some embodiments, the second baking mixture comprises flour and/or starch, and comprises 5% to 100% the shaping auxiliary component based on the total weight of the flour and/or starch comprised therein. Preferably, the second baking mixture comprises 10% to 50% the shaping auxiliary component by the total weight of the flour and/or starch comprised therein. Particularly preferably, the second baking mixture comprises 15% to 35% the shaping auxiliary component by the total weight of the flour and/or starch comprised therein.

In some embodiments, the second baking mixture comprises flour and/or starch, and further comprises 100% to 170% water, 5% to 100% the shaping auxiliary component, 5% to 100% saccharide sweeteners (such as sugar, etc.), 0.1% to 2% emulsifier, and 0.1% to 5% edible oil and fat, by the total weight of the flour and/or starch comprised therein. Preferably, the second baking mixture further comprises 110% to 140% water, 10% to 50% the shaping auxiliary component, 20% to 50% saccharide sweeteners (such as sugar, etc.), 0.1% to 2% emulsifier, and 0.1% to 5% edible oil and fat by the total weight of the flour and/or starch comprised in the second baking mixture.

The edible oil and fat comprises the edible oil and fat commonly used in the art, comprising vegetable oil and fat, animal oil and fat, shortening, etc.

In some embodiments, the at least one first sheet and the at least one second sheet of the food provides a visually distinguishing sensation. In some embodiments, the position where the at least one first sheet is adjacent to the at least one second sheet comprises a joint part between the first sheet and the second sheet. In some embodiments, there is no mixing between the first sheet composition and the second sheet composition at the junction portion. In some embodiments, the joint part is a visually distinguishing circumscription between the first sheet and the second sheet. In some embodiments, the circumscription can be a line, a curve, a broken line or combinations thereof. In some embodiments, the at least one first sheet may have a color that is visually distinguishing from that of the at least one second sheet. In some embodiments, the first sheet and the second sheet have different colors of the same color scheme. Preferably, the first sheet is black, and the second sheet is white. Preferably, the first sheet is brown, and the second sheet is black. Preferably, the first sheet is white, and the second sheet is yellow.

In some embodiments, the first sheet and the second sheet have the same or different flavors. Preferably, the first sheet and the second sheet can have cocoa flavor and baking flavor, cocoa flavor and cocoa flavor, baking flavor and cocoa flavor, baking flavor and baking flavor, baking flavor and cheese flavor, cheese flavor and baking flavor, and cheese flavor and cheese flavor, respectively.

In some embodiments, besides the first sheet and the second sheet, the strip may have a plurality of sheets connected in the width direction. In some embodiments, the strip further comprises a third strip adjacent to the first sheet or the second sheet in the width direction. The third sheet extends in parallel with the first sheet and the second sheet in the length direction. In some embodiments, the third sheet is able to provide a visually distinguishing or non-distinguishing sensation from the first and second sheets. In some embodiments, the third sheet can have the same or different flavors from the first and second sheets.

The food which is based on a baked foodstuff has various shapes and sizes. For example, the food can be plate shaped, cup or cone shaped, or cylinder shaped. In some embodiments, the cylinder shaped food can be food of a hollow cylinder shape, hollow cone shape or hollow pallet shape. In some embodiments, the cylinder shaped food can have a cross section of round, ellipse, square, rectangle, polygon, triangle or irregular shape. If needed, further processing may be carried out on the food after baking. For example, the food can be wrapped, pressed or be shaped in a mold. In some embodiments, the food can be used in combination with confectionery materials, for example, ice cream or chocolate or other fat-containing materials, such as a fat based cream, to form various confectionery products. Moreover, the cylinder shaped food can also be filled with confectionery materials, preferably those with relatively low water migration. The food can be used in direct contact with the confectionery materials to be filled, or a barrier layer may be applied to the surface of the food, which is in contact with the confectionery material, to prevent the water migration. For example, a barrier layer may be applied to part or all of the surface of the food, which is in contact with the confectionery material. Any conventional edible material for a barrier layer, preferably a fat based material, can be used, for example, chocolate or a chocolate substitute.

In some embodiments, the food provided is configured into any configuration based on the foregoing sheet strip. The configuration based on the sheet strip comprises a body formed by wrapping the sheet strip in a certain winding interval and a cavity defined by the body. The body comprises a helical banded region disposed on its outer surface, where the helical banded region is formed by the second sheet. In some embodiments, the ratio of the second width to the winding interval is 1:30 to 10:1; preferably, the ratio of the second width to the winding interval is 1:10 to 1:1.

In some embodiments, the cavity can be filled with a filling or gas. The filling is selected from the common edible filling materials in the field. The filling can be solid or fluid. Preferably, the filling is flowable during processing. Preferably, the filling is selected from the group consisting of jam, chocolate, and a mixture of sugar and oil/fat.

In some embodiments, at least part of the body can be covered by an edible material. The edible material comprises any edible materials commonly used in the field for covering or enrobing the food used. In some embodiments, the edible materials used for the covering comprise chocolate, icing, caramel, nuts, dried fruit or combinations thereof.

In some embodiments, the food can be a baked foodstuff segment. The baked foodstuff segment comprises the helical banded region including at least one whole helix. In some embodiments, the ends of the baked foodstuff segment can be open, partly closed or completely closed, or combinations thereof.

In some embodiments, the baked foodstuff segment has a cylindrical configuration. In some embodiments, the baked foodstuff segment with the cylindrical configuration has a length of 10 mm to 500 mm; preferably, the baked foodstuff segment with the cylindrical configuration has a length of 20 mm to 500 mm; more preferably, the baked foodstuff segment with the cylindrical configuration has a length of 20 mm to 300 mm.

In some embodiments, the baked foodstuff segment has a pillow shaped configuration. In some embodiments, the baked foodstuff segment with the pillow shaped configuration has a length of 10 mm to 100 mm; preferably, the baked foodstuff segment with the pillow shaped configuration has a length of 20 mm to 50 mm. In some embodiments, the ends of the baked foodstuff segment with the pillow shaped configuration can be completely closed, and can also be partly closed.

According to another aspect, a method of preparing food is provided, comprising:

i) providing at least one first sheet and at least one second sheet to form a sheet strip; the first sheet comprising a first region, and the second sheet comprising a second region; wherein, the at least one second sheet is adjacent to the at least one first sheet in a width direction of the sheet strip, and the at least one first sheet and the at least one second sheet extend in parallel in a length direction of the sheet strip; the sheet strip is a flour and/or starch based baked foodstuff; the second region comprises a shaping auxiliary component in an amount of 0.5-15 wt % by the total weight of the flour and/or starch of the baked foodstuff; the shaping auxiliary component has a glass-transition temperature of less than 0° C.; and the second region is present in an amount of at least 1 wt % by the total weight of the baked foodstuff;

ii) wrapping the sheet strip in a certain winding interval to form a shaped baked foodstuff comprising a cylinder body and a cavity defined by the body, and the second sheet comprising a helical banded region disposed on the outer surface of the body; and iii) cooling the shaped baked foodstuff to form the food.

In some embodiments, the strip is helically wrapped at a certain lead angle. In some embodiments, in the wrapping step, the baked foodstuff strip is wrapped to have a cylinder shape or cone shape.

In some embodiments, wherein the ratio of the width of the second sheet to the winding interval is 1:30 to 10:1; preferably, the ratio of the width of the second sheet to the winding interval is 1:10 to 1:1.

In some embodiments, wherein the method further comprises a cutting step prior to the cooling, to form the shaped baked foodstuff into a baked foodstuff segment, wherein the baked foodstuff segment comprises the helical banded region including at least one whole helix.

In some embodiments, the method provided optionally comprises a step of filling a gas or a filling into the cavity before or after the cutting step. In some embodiments, the filling step and the wrapping step may be carried out simultaneously. In some embodiments, the method provided optionally comprises a step of covering at least part of the body with edible materials after the cutting step.

While wrapping the sheet strip, if a certain amount of the shaping auxiliary component (such as polyol) is added in the very edge of the sheet strip, due to the presence of the shaping auxiliary component, the edge of the strip will become much softer and more extensible during the processing. Such edge portion provides a more efficient wrapping and binding to the product roll after wrapping, leading to better roll forming and a smoother subsequent process (like cutting the roll into pillows). Meanwhile, the breakage of the edge portion can be reduced significantly.

DESCRIPTION OF THE DRAWINGS

The present invention can be better understood through the illustration of the following embodiments, where.

DETAILED EMBODIMENTS

Figure 1:
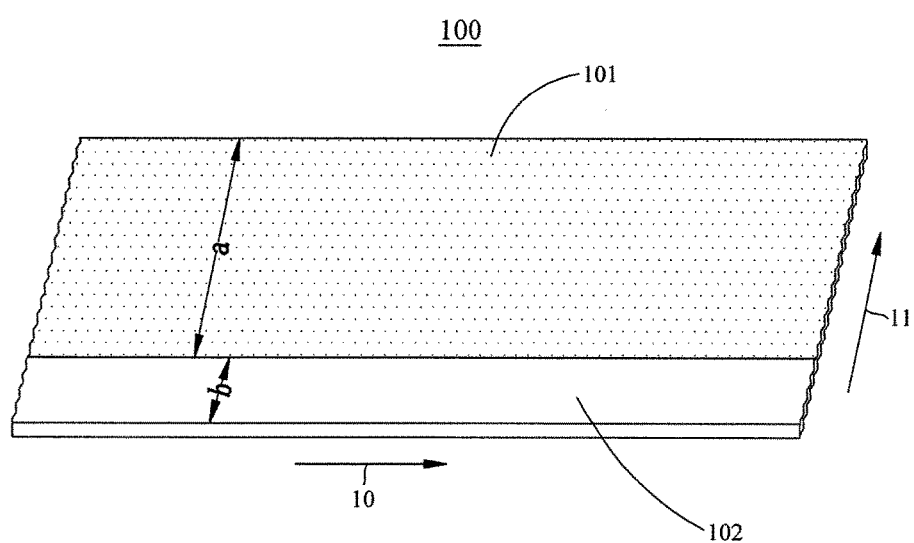
FIG. 1 shows the sheet strip according to certain embodiments.

All the raw materials are food grade materials that are commonly used in the field, unless specified otherwise. All the devices, including baking devices, shaping devices, etc., are conventional in the field, unless specified otherwise.

Generally, the formula of the baking mixture used for preparing a sheet of baked foodstuff (such as a wafer biscuit) is commonly known in the art. For instance, a typical formula comprises flour and/or starch, sweetening agent, edible salt, edible fat, emulsifier, swelling agent and water.

As used herein, the term "flour and/or starch" refers to the powder made by grounding grains, beans, and the seed, root, tuber, etc. of other plants. The flour and/or starch used comprises, but is not limited to, the powder made by grounding one or more of wheat, corn, rice, millet, barley, sorghum, pearl barley, oat, buckwheat, hulless oat, pumpkin, kudzuvine root, potato, cassava, soybean, red bean, mung bean, kidney bean, broad bean, pea, cowpea, chickpea, lotus root, water chestnut, lily, konjak, and canna edulisker.

As used herein, the term "saccharide sweetener" refers to the saccharide able to give sweet taste to food, for example, sugar (saccharose), glucose, fructose, maltose, starch sugar, lactose, etc. Additionally, a sweetening agent of other kinds can also be included in the food.

Additionally, if needed, other food additives known in the field can also be added into the respective regions of the food, such as various desired flavor agents, food coloring, etc.

Unless specified otherwise, the preparation of the food is performed through devices and steps well-known by those skilled in the art. Generally, the preparation of the food comprises the following steps:

The Preparation of the Baking Mixture:

A first baking mixture and a second baking mixture are prepared, respectively, according to their respective formulas. Specifically, according to the respective formulas, raw materials for the first baking mixture or the second baking mixture are fed into a stirring bowl in order, and stirred to obtain uniform slurries of the first baking mixture or the second baking mixture.

The Formation of the Sheet Strip:

A baking device known in the field is provided, for example, oven, baker, ovenware or drum, etc. which are commonly known by those skilled in the art. The foregoing uniform slurries of the first baking mixture and the second baking mixture are simultaneously provided to the baking device, such as ovenware, and then the slurries of the first baking mixture and the second baking mixture are evenly flattened out on the ovenware with a scraper. The first and second baking mixture slurries are disposed in a particular way, for example, the first and second baking mixture slurries are substantially adjacently disposed to each other, so as to form the food having a sheet strip configured with at least one first region and at least one second region during the baking step.

The first and second baking mixture slurries disposed in the particular way above are baked in order to prepare the baked foodstuff based multiple-region food which comprises a sheet strip. The baking step can be performed through a conventional process known in the field. The baking step is performed at a baking temperature of 90 to 126° C., preferably 100 to 170° C., and the baking step can be carried out for 10-240 seconds, preferably, 30-60 seconds.

Demolding and (Optionally) Reshaping:

After baking, a resulting continuous and flattened sheet strip is removed from the baking mold (such as ovenware) while hot. Specifically, as shown in FIG. 1, the sheet strip 100 of the present invention comprises at least one first sheet 101 and at least one second sheet 102. The first sheet has a first width (a), and the second sheet has a second width (b). The first sheet comprises a first region, and the second sheet comprises a second region. The sheet strip has a length direction 10 and a width direction 11, wherein the at least one second sheet 102 is adjacent to the at least one first sheet 101 in the width direction 11, and the first sheet 101 and the second sheet 102 extend in parallel in the length direction 10. In one specific embodiment, the sheet strip 100 has a first width (a) of 70 to 79 mm, a second width (b) of 1 to 10 mm, and a thickness of about 0.2 to 0.6 mm.

This sheet strip 100 is removed from the baking mold while hot after the baking step, may be cut into a sheet having a dimension of 20 mm*80 mm, and cooled, and then may be subjected to packaging as the final food.

Furthermore, the sheet strip 100 can be further processed while in a hot state through, for example, folding, wrapping, deep-drawing, pressing, embossing, stamping, bending, folding, etc. to be reshaped, so as to form the food with various shapes. Then, the reshaped food is hardened through a short cooling to become fixed and unchangeable.

Figure 2:
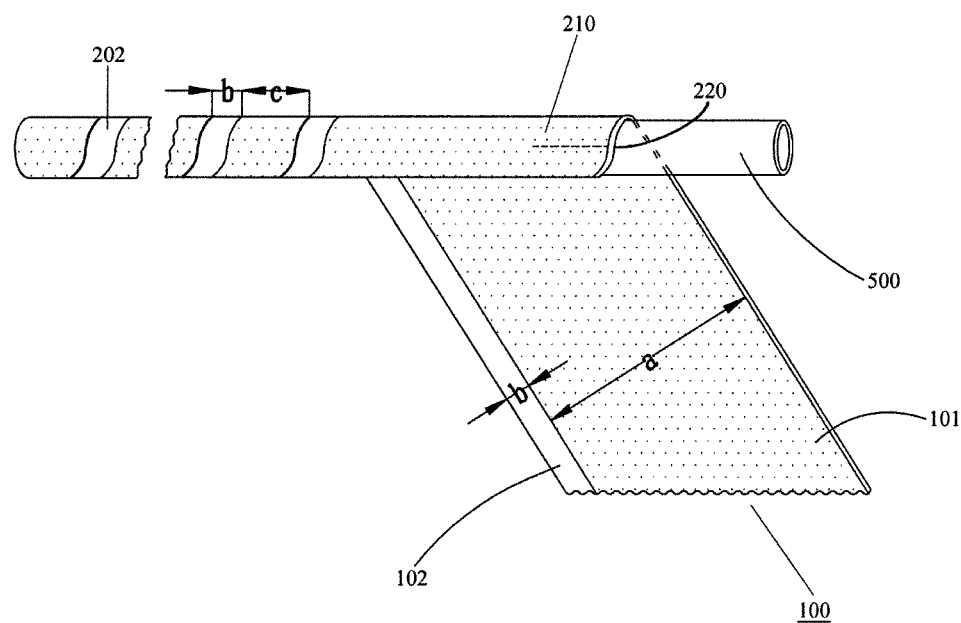
FIG. 2 shows the schematic of the wrapping of the sheet strip according to certain embodiments.

Taking reshaping via wrapping as an example, as shown in FIG. 2, the demolded sheet strip 100 is fed into a shaping device while hot, and is wrapped in a certain winding interval (c) to form body 210 and cavity 220 defined by the body, with the auxiliary of a core rod 500 and a wrapping auxiliary wheel (not shown), so as to finally form the baked foodstuff based food with a cylinder shaped body. In the resulting food, the body 120 comprises a helical banded region 202 disposed on its outer surface, where this banded region is formed by the second sheet 102. Optionally, a filling can be filled into the cavity 220 during or after the wrapping. In a specific embodiment, the diameter of the core rod is 6 to 12 mm, and the winding interval (c) is about 5 to 25 cm.

Figure 3:
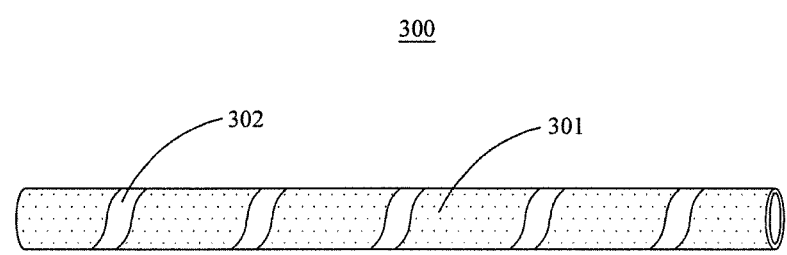
FIG. 3 shows the cylinder shaped food according to certain embodiments.

In some embodiments, the resulting baked foodstuff based food with a cylinder shaped body is intermittently cut to form baked foodstuff segments 300 with a certain length, as shown in FIG. 3. Both the first region 301 formed by the first sheet and the second region 302 formed by the second sheet are visible on the surface of the segments 300. This cylinder shaped baked foodstuff segment 300 can be directly cooled and hardened and then packaged as the final food. In a specific embodiment, the length of the baked foodstuff segment 300 is 90 to 150 mm.

Figure 4A:
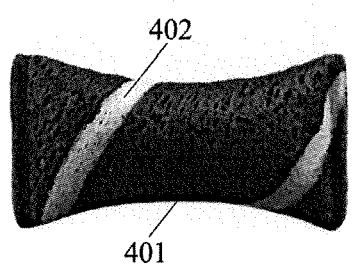
FIGS. 4A and 4B show the pillow shaped food according to certain embodiments.
Figure 4B:
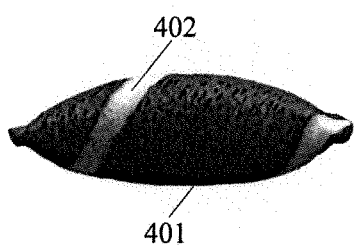

In some embodiments, the resulting body in a cylinder shape can be further processed by a shaping device for production of a pillow shaped product, such that the body can be further cut into baked foodstuff segments 400 in a pillow shape, as shown in FIG. 4. FIG. 4A and FIG. 4B show the baked foodstuff segment 400 in pillow shape that is viewed from different angles, respectively. Both the first region 401 formed by the first sheet and the second region 402 formed by the second sheet are visible on the surface of the baked foodstuff segment in a pillow shape. The ends of this baked foodstuff segment in a pillow shape may be, optionally, open, partially closed or completely closed. The foregoing baked foodstuff segment 400 in a pillow shape can be subjected to cooling and then packaged as the final food. In a specific embodiment, the length of the baked foodstuff segment 400 in a pillow shape is 20 to 50 mm.

Packaging:

After cooling, the food in a cylinder shape or pillow shape may be packaged via a packaging device commonly known in the field.

On the basis of the foregoing conventional preparation process, the following examples are provided to further illustrate the present disclosure. The examples below describe the products within the scope of the present disclosure and the method of preparing the product, which however cannot be consider to limit the present disclosure in any way. Those skilled in the art can alter and modify the present disclosure, which is to say, those skilled in the art can conceive examples covering a wide scope of various possible variants, and are able to make adjustments to the technical solution according to various application situations. In the examples described below, the amount of various materials is measured by parts by weight.

EXAMPLES

Taking a multi-region food with black/white stripes as an example, an exemplary preparation process of the food is provided.

As illustrated in the exemplary embodiment, in the multi-region food prepared according to the formula of this example, the first sheet is in black, and the second sheet is in white. Moreover, the first sheet and the second sheet provide cocoa flavor and baking flavor, respectively. The first baking mixture used for forming the first sheet can be prepared according to a conventional formula in the field. Table 1 shows the formula of the first baking mixture.

TABLE 1

The formula of the first baking mixture

| Ingredients | Parts by weight |
| --- | --- |
| Water | 150 |
| Sugar | 80 |
| Edible salt | 1 |
| Food flavoring | 0.06 |
| Flour | 100 |
| Cocoa powder | 10 |
| Emulsifier | 0.3 |
| Edible oil | 3 |

The formula of the second baking mixture for forming the second sheet is shown in Table 2, in which the amount of various materials in the formula is measured by parts by weight.

TABLE 2

The formula of the second baking mixture

| Ingredients | Formula 0 (control) | Formula 1 | Formula 2 | Formula 3 | Formula 4 | Formula 5 |
| --- | --- | --- | --- | --- | --- | --- |
| Flour | 100 | 100 | 100 | 100 | 100 | 100 |
| Water | 120 | 120 | 120 | 120 | 120 | 120 |
| Sugar | 80 | 38 | 38 | 38 | 38 | 38 |
| Erythritol | — | 21 | — | 11 | 15 | 40 |
| Sorbitol | — | — | 21 | 10 | — | — |
| Emulsifier | 0.4 | 0.4 | 0.4 | 0.4 | 0.4 | 0.4 |
| Edible oil or fat | 4 | 4 | 4 | 4 | 4 | 4 |

According to the formulas of the first and second sheet shown in Table 1 and 2, respectively, a food formed by a sheet strip is prepared through a conventional preparation method in the field as mentioned above. The sheet strip has a first width (a) of about 77 mm, a second width (b) of about 3 mm, and a thickness of about 0.38 mm. This multi-region food can be packaged directly as the finished product, or be further processed.

Optionally, the sheet strip-like multi-region food can be wrapped to have a cylinder shape. The diameter of the core rod used for the wrapping is about 9 mm, and the winding interval (c) is about 17 mm. The cylinder shaped food can be further cut into segments with a length of about 100 mm. These segments can be further processed into food of a pillow shape with a length of 30 mm. Both of the ends of the food of either cylinder shape or pillow shape may optionally be open or completely closed or partially closed.

The property of the resulting food (including food of a sheet strip, and food of a cylinder shape or pillow shape, as described above) is assessed; in which, the assessment results of the food of various shapes made from the same second sheet formula are the same. The assessment results are shown in Table 3 below:

TABLE 3

| | | \multicolumn{6}{c}{Product property assessment} | | | | | |
|---|---|---|---|---|---|---|---|
| The first sheet / The second sheet | | The conventional formula shown in Table 1 | | | | | |
| | | Formula 0 (control) | Formula 1 | Formula 2 | Formula 3 | Formula 4 | Formula 5 |
| Assessment items | cracking between two regions | yes | no | no | no | no | no |
| | tilting of the second region* | yes | no | no | no | no | no |
| | breaking in the second region* | severe | little | little | little | little | little |
| | The appearance of the whole food** | coarse | smooth | smooth | smooth | smooth | smooth |
| | Crumbs in the package | much | little | little | little | little | little |

*This assessment is performed regarding the second region serving as the edge portion of the sheet shaped food or as the band region of a cylinder shaped food obtained by wrapping.
**This assessment is performed regarding the appearance of the cylinder shaped food and the pillow shaped food which is further formed by the cylinder shaped food.

In summary, the multi-region food provided, which comprises the shaping auxiliary component, can efficiently reduce the state of cracking between the two regions and the tilting or breaking of the peripheral portion, which results in the multi-region food prepared according to the conventional formula in the field, thereby offering a smoother and more attractive appearance to the product and efficiently reducing the crumbs within the packaging. Meanwhile, the food comprises the shaping auxiliary component only within part of the regions thereof, thereby efficiently reducing the quantity used, which takes into account the production cost as well, while guaranteeing the quality of the product.

What is claimed is:

1. A food comprising a flour and/or starch based baked crispy foodstuff, the baked crispy foodstuff comprising:
    a sheet strip including at least one first sheet composed of a first baking mixture and at least one second sheet composed of a second baking mixture different from the first baking mixture, the second sheet being in contact with the first sheet;
    the second sheet comprising a shaping auxiliary component in an amount of 0.5-15 wt % by the total weight of the flour and/or starch of the baked crispy foodstuff;
    the shaping auxiliary component being a polyol having from 4 to 6 carbon atoms and having a glass-transition temperature of less than 0° C.;
    the first sheet being free of the shaping auxiliary component;
    wherein the second sheet is present in an amount of at least 1 wt % by the total weight of the food; and
    wherein:
        the first sheet has a width, and the second sheet has a width,
        the sheet strip has a length direction and a width direction,
        the at least one second sheet is adjacent to the at least one first sheet in the width direction,
        the first sheet and the second sheet extend in parallel in the length direction,
        the baked crispy foodstuff comprises a body formed through wrapping the sheet strip in a certain winding interval and a cavity defined by the body; and
        the body comprises a helical banded region formed by the at least one second sheet.

2. The food according to claim 1, wherein the polyol is selected from the group consisting of erythritol, xylitol, sorbitol, mannitol and combinations thereof.

3. The food according to claim 1, wherein the second sheet comprises the shaping auxiliary component of 0.5 to 10 wt % by the total weight of the flour and/or starch of the baked crispy foodstuff.

4. The food according to claim 1, wherein the second sheet comprises the shaping auxiliary component of 0.7 to 5 wt % by the total weight of the flour and/or starch of the baked crispy foodstuff.

5. The food according to claim 1, wherein the at least one first sheet and the at least one second sheet are configured alternatingly.

6. The food according to claim 1, wherein the at least one first sheet and the at least one second sheet provide a visually distinguishing sensation.

7. The food according to claim 1, wherein the ratio of the first width to the second width is 79:1 to 1:79.

8. The food according to claim 1, wherein the proportion of the first width to the second width is 79:1 to 70:10.

9. The food according to claim 1, wherein,
    the second baking mixture comprises 100% to 170% water, 5% to 100% the shaping auxiliary component, 5% to 100% sugar, 0.1% to 2% emulsifier, and 0.1% to 5% edible fat, by the total weight of the flour and/or starch comprised in the second baking mixture.

10. The food according to claim 1, wherein, the second baking mixture comprises 110% to 140% water, 10% to 50% the shaping auxiliary component, 20% to 50% sugar, 0.1% to 2% emulsifier, and 0.1% to 5% edible fat by the total weight of the flour and/or starch comprised in the second baking mixture.

11. The food according to claim 1, wherein the cavity is filled with a filling or a gas.

12. The food according to claim 1, wherein the food is a baked crispy foodstuff segment comprising the helical banded region including at least one whole helix.

13. The food according to claim 12, wherein the baked crispy foodstuff segment has a cylinder or a pillow configuration.

14. A method of preparing a food, comprising:
i) providing at least one first sheet composed of a first baking mixture and at least one second sheet composed of a second baking mixture different from the first baking mixture to form a sheet strip, where the at least one second sheet is co-planar to the first sheet and in contact with the first sheet;
wherein,
the at least one second sheet is adjacent to the at least one first sheet in a width direction of the sheet strip, and the at least one first sheet and the at least one second sheet extend in parallel in a length direction of the sheet strip;
the sheet strip is a baked crispy foodstuff based on flour and/or starch;
the second sheet comprises a shaping auxiliary component in an amount of 0.5-15 wt % by the total weight of the flour and/or starch of the baked crispy foodstuff, the first sheet being free of the shaping auxiliary component;
the shaping auxiliary component being a polyol and having from 4 to 6 carbon atoms and a glass-transition temperature of less than 0° C.; and
the second sheet is present in an amount of at least 1 wt % by the total weight of the baked crispy foodstuff;
ii) wrapping the sheet strip in a certain winding interval to form a shaped baked crispy foodstuff comprising a cylinder body and a cavity defined by the cylinder body, the cylinder body comprising a helical banded region formed by the second sheet; and
iii) cooling the shaped baked crispy foodstuff to form the food.

15. A food comprising a flour and/or starch based baked crispy foodstuff, the baked crispy foodstuff comprising:
a sheet strip including at least one first sheet composed of a first baking mixture and at least one second sheet composed of a second baking mixture different from the first baking mixture, the second sheet being adjacent to the first sheet and in contact with the first sheet;
the second sheet comprising a shaping auxiliary component in an amount of 0.5-15 wt % by the total weight of the flour and/or starch of the baked crispy foodstuff;
the shaping auxiliary component being a polyol having from 4 to 6 carbon atoms and having a glass-transition temperature of less than 0° C.;
the first sheet being free of the shaping auxiliary component;
wherein the second sheet is present in an amount of at least 1 wt % by the total weight of the food; and
wherein the sheet strip of the baked crispy foodstuff is reshaped while hot after being baked.

\* \* \* \* \*